US010458244B2

(12) United States Patent
Tomeo et al.

(10) Patent No.: US 10,458,244 B2
(45) Date of Patent: Oct. 29, 2019

(54) TUNED RETENTION RING FOR ROTOR DISK

(71) Applicant: UNITED TECHNOLOGIES CORPORATION, Farmington, CT (US)

(72) Inventors: Peter V. Tomeo, Middletown, CT (US); Carney R. Anderson, East Haddam, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 78 days.

(21) Appl. No.: 15/787,478

(22) Filed: Oct. 18, 2017

(65) Prior Publication Data

US 2019/0112928 A1 Apr. 18, 2019

(51) Int. Cl.
| F01D 5/02 | (2006.01) |
| F04D 29/66 | (2006.01) |
| F04D 29/32 | (2006.01) |
| F04D 29/34 | (2006.01) |
| F01D 5/30 | (2006.01) |

(52) U.S. Cl.
CPC ........... *F01D 5/027* (2013.01); *F01D 5/3015* (2013.01); *F04D 29/321* (2013.01); *F04D 29/325* (2013.01); *F04D 29/34* (2013.01); *F04D 29/662* (2013.01); *F05D 2220/32* (2013.01); *F05D 2230/60* (2013.01); *F05D 2260/30* (2013.01); *F05D 2260/96* (2013.01)

(58) Field of Classification Search
CPC ...... F01D 5/027; F01D 5/3015; F04D 29/321; F04D 29/325; F04D 29/34; F04D 29/662; F05D 2220/32; F05D 2230/60; F05D 2260/30; F05D 2260/96
USPC ...................................................... 416/220 R
See application file for complete search history.

(56) References Cited

U.S. PATENT DOCUMENTS

| 4,304,523 A * | 12/1981 | Corsmeier | ............ | F01D 5/3015 |
| | | | | 29/889.21 |
| 4,817,455 A * | 4/1989 | Buxe | ....................... | F01D 5/027 |
| | | | | 415/119 |

(Continued)

FOREIGN PATENT DOCUMENTS

| EP | 1746250 | 1/2007 |
| EP | 2290244 | 3/2011 |

(Continued)

OTHER PUBLICATIONS

European Patent Office, European Search Report dated Mar. 15, 2019 in Application No. 18200956.3.

*Primary Examiner* — Lindsay M Low
*Assistant Examiner* — Yi-Kai Wang
(74) *Attorney, Agent, or Firm* — Snell & Wilmer L.L.P.

(57) ABSTRACT

A rotor disk assembly may include a rotor disk and a retention ring coupled to the rotor disk. Generally, the retention ring is tuned to adjust a modal frequency response of the rotor disk/rotor disk assembly. In various embodiments, dimensions of the retention ring vary circumferentially. In various embodiments, the retention ring includes an axially extending flange and a radially extending flange. A radial thickness of the axially extending flange may vary circumferentially and/or an axial thickness of the radially extending flange may vary circumferentially.

18 Claims, 4 Drawing Sheets

(56) References Cited

U.S. PATENT DOCUMENTS

| | | |
|---|---|---|
| 7,252,481 B2 | 8/2007 | Stone |
| 8,197,189 B2 | 6/2012 | Bonniere et al. |
| 8,348,620 B2 | 1/2013 | Dejaune et al. |
| 9,410,436 B2 | 8/2016 | Kulathu et al. |
| 2013/0004313 A1* | 1/2013 | El-Aini .................... F01D 5/10 |
| | | 416/134 R |
| 2015/0192019 A1 | 7/2015 | Mancuso et al. |
| 2016/0298546 A1* | 10/2016 | Edwards .................. F01D 5/16 |

FOREIGN PATENT DOCUMENTS

| | | |
|---|---|---|
| EP | 2565398 | 3/2013 |
| EP | 3093435 | 11/2016 |
| GB | 2194000 | 2/1988 |

\* cited by examiner

TUNED RETENTION RING FOR ROTOR DISK

FIELD

The present disclosure relates to rotor disk assemblies, and more specifically, to tuning an aeromechanical response of a rotor disk assembly via a retention ring.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The fan section, the compressor section, and the turbine section typically include one or more rotor disk assemblies. A rotor disk assembly, for example, generally includes a rotor disk and a plurality of airfoils integrally formed with or mechanically coupled to the rotor disk.

SUMMARY

In various embodiments, the present disclosure provides a rotor disk assembly that includes a rotor disk and a retention ring coupled to the rotor disk. Generally, the retention ring is tuned to adjust a modal frequency response of the rotor disk/rotor disk assembly. In various embodiments, dimensions of the retention ring vary circumferentially. In various embodiments, the retention ring includes an axially extending flange and a radially extending flange. A radial thickness of the axially extending flange may vary circumferentially and/or an axial thickness of the radially extending flange may vary circumferentially.

In various embodiments, the radially extending flange is configured to provide axial retention of an airfoil coupled to the rotor disk. In various embodiments, the axially extending flange is configured to provide radial retention of an airfoil coupled to the rotor disk. In various embodiments, the axially extending flange is a first axially extending flange having a first axially extending surface configured to engage the airfoil to provide radial retention. The retention ring may further include a second axially extending flange having a second axially extending surface also configured to engage the airfoil to provide radial retention. In various embodiments, the retention ring is an integral hoop.

Also provided herein, according to various embodiments, is a gas turbine engine that includes a rotor disk having an airfoil coupled to the rotor disk and a retention ring coupled to the rotor disk. The retention ring configured/tuned to adjust a modal frequency response of the rotor disk. In various embodiments, the retention ring is coupled to a forward side of the rotor disk.

Also provided herein, according to various embodiments, is a method of manufacturing a gas turbine engine. The method may include coupling an airfoil to a rotor disk and coupling a retention ring to the rotor disk, wherein the retention ring is tuned to adjust a modal frequency response of the rotor disk. In various embodiments, the method further includes tuning the retention ring before coupling the retention ring to the rotor disk. In various embodiments, turning the retention ring includes varying dimensions of the of the retention ring circumferentially in response to a predicted modal frequency response. In various embodiments, coupling the retention ring to the rotor disk comprises aligning the retention ring with the rotor disk in response to the predicted modal frequency response. In various embodiments, coupling the retention ring to the rotor disk includes coupling the retention ring to a forward side of the rotor disk.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
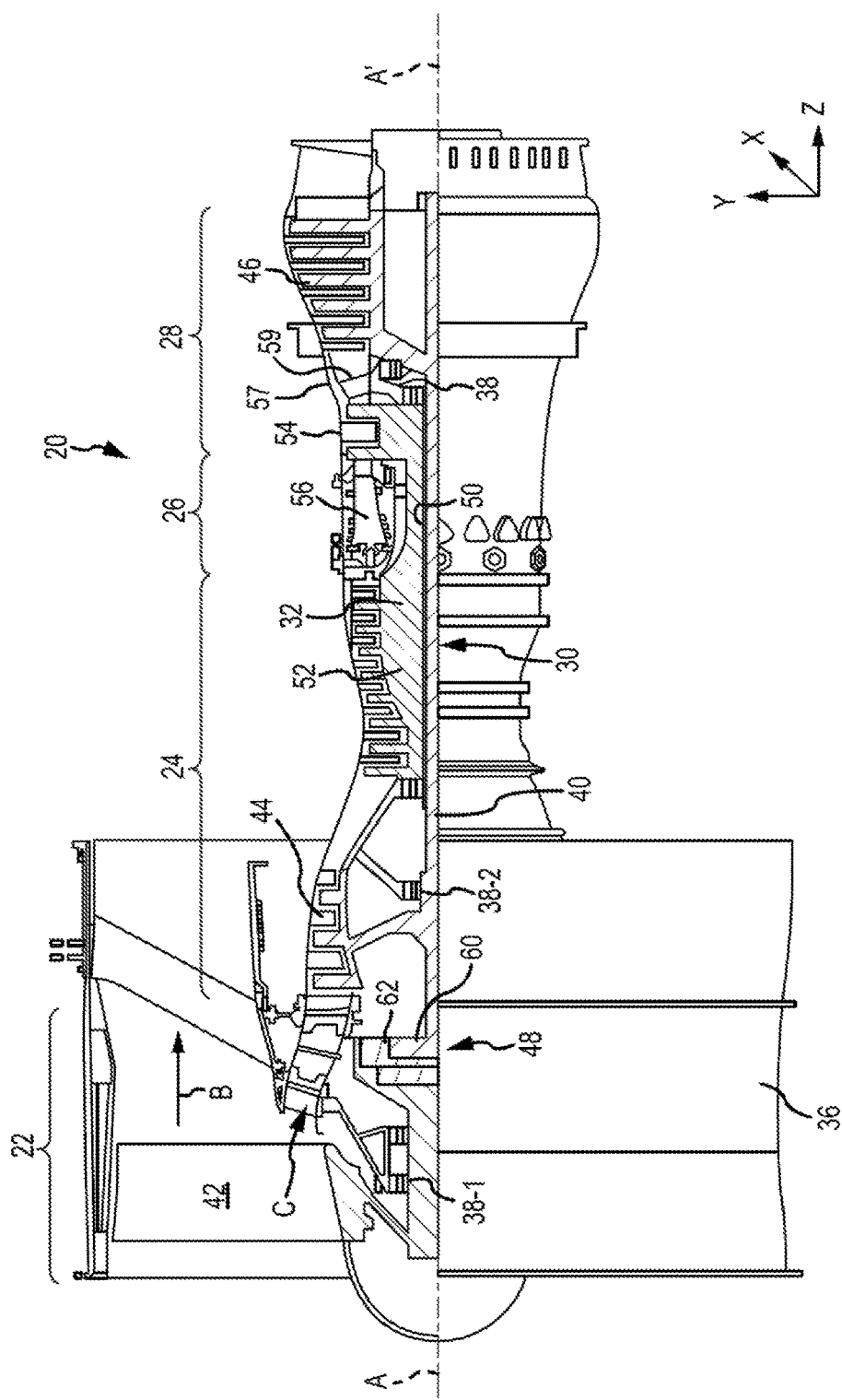
FIG. 1 is a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions and the x direction on the provided xyz axis refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 via structure 59 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
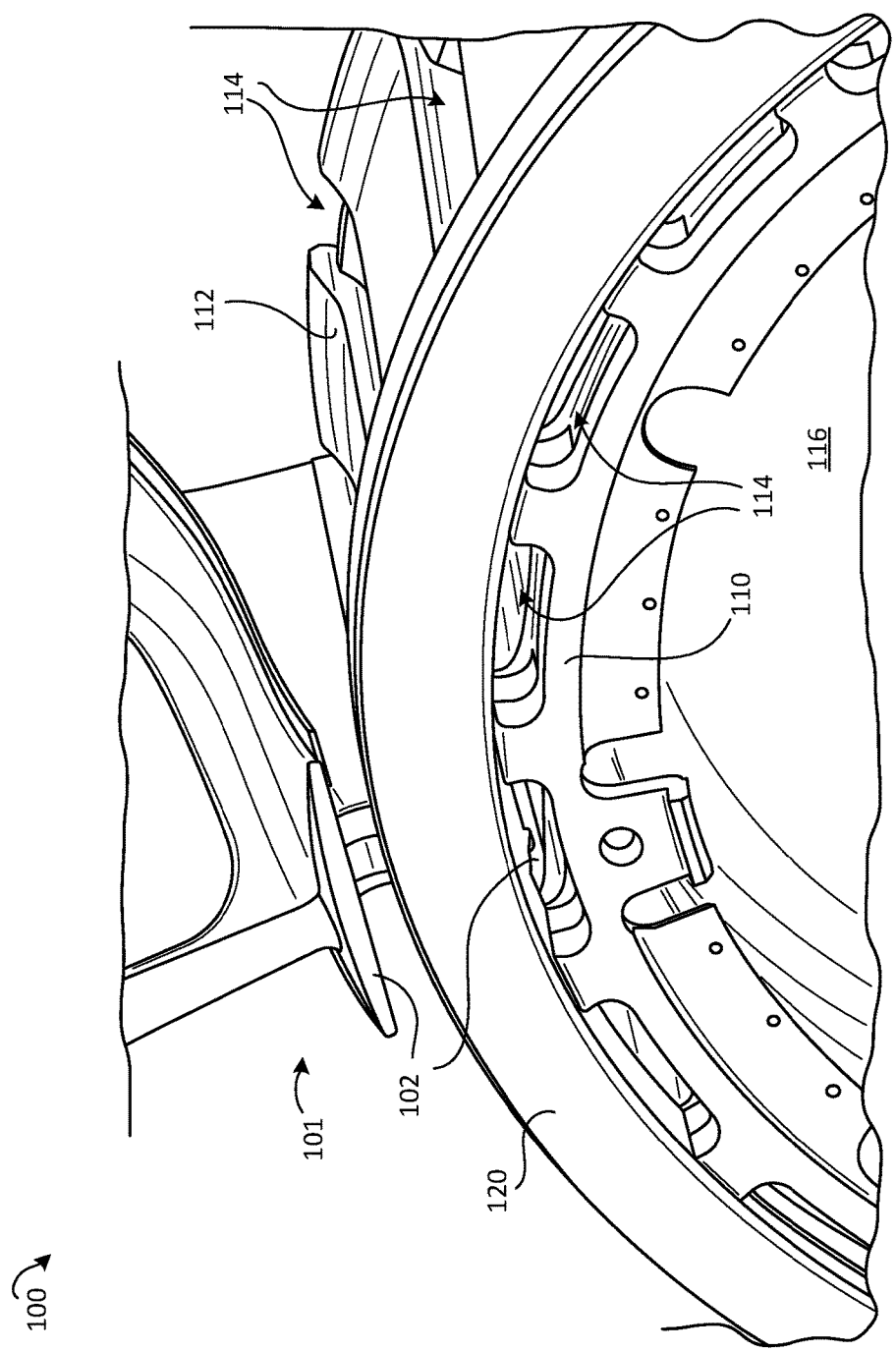
FIG. 2 is a perspective view of a rotor disk assembly, in accordance with various embodiments.

In various embodiments, and with reference to FIG. 2, a rotor disk assembly 100 is provided. The rotor disk assembly 100, according to various embodiments, includes a rotor disk 110 and a retention ring 120. The rotor disk 110 may be a rotor in the compressor section 24 of gas turbine engine 20. In another aspect, the rotor disk 110 may be a rotor in the fan section 22 of the gas turbine engine 20. In other aspects, the rotor disk 110 may be located in the turbine section 28 of the gas turbine engine 20. Such description may also be applicable to impellers as well as additional or other stages. It should also be understood that other rotor modules will also benefit from the various embodiments herein described.

In various embodiments, and with continued reference to FIG. 2, a plurality of airfoils 101 extend from a rim 112 of the rotor disk 110. The rim 112 is a radially outward periphery of the rotor disk 110 and the rotor disk 110 may include a bore 116 defined by an inner circumference of the rotor disk 110. The airfoils may be integrally formed with the rotor disk 110 or the airfoils 101 may be mechanically coupled/retained to the rim 112 of the rotor disk 110. For example, the a plurality of slots 114 may be defined in the rim 112 of the rotor disk 110, and a root portion 102 of the airfoils 101 may be disposed within the slots 114. In various embodiments, conventional airfoils that are mechanically coupled to rotor disks may experience deflection due to insufficient structural stiffness, which may contribute to detrimental frequency modes of the rotor disk assembly. The rotor disk assembly 100 of the present disclosure, however, utilizes a tuned retention ring 120 to improve the stiffness of the rotor disk assembly 100 and to improve the modal frequency response of the rotor disk assembly 100.

Generally, the retention ring 120 of the rotor disk assembly 100 is tuned to adjust the modal frequency response of the rotor disk 110. In other words, the present disclosure, in various embodiments, provides a rotor disk assembly 100 that allows for the modal frequency response of the rotor disk assembly (e.g., the rotor disk 110 and the airfoils 101)

to be controlled via shaping and configuring the retention ring 120 of the rotor disk assembly 100, thereby allowing weight optimization and reduced vibratory stress to be the driving design consideration in shaping the geometry of the airfoils 101. Said differently, the shape and geometry of the retention ring 120 is customized to tune the frequency mode of the rotor disk assembly 100, thus allowing a greater degree of consideration to be given to the shape and geometry of the airfoils 101 for purposes of weight optimization and vibratory stress mitigation. As used herein, the term "tune" refers to designing the geometry of the retention ring 120 so as to modify a specific frequency mode to the rotor disk 110 (including the airfoils 101), thereby controlling the aeromechanical response of the rotor disk 110 to limit the structural stress experienced by the rotor disk assembly 100 and/or the surrounding and adjacent components.

Figure 3:
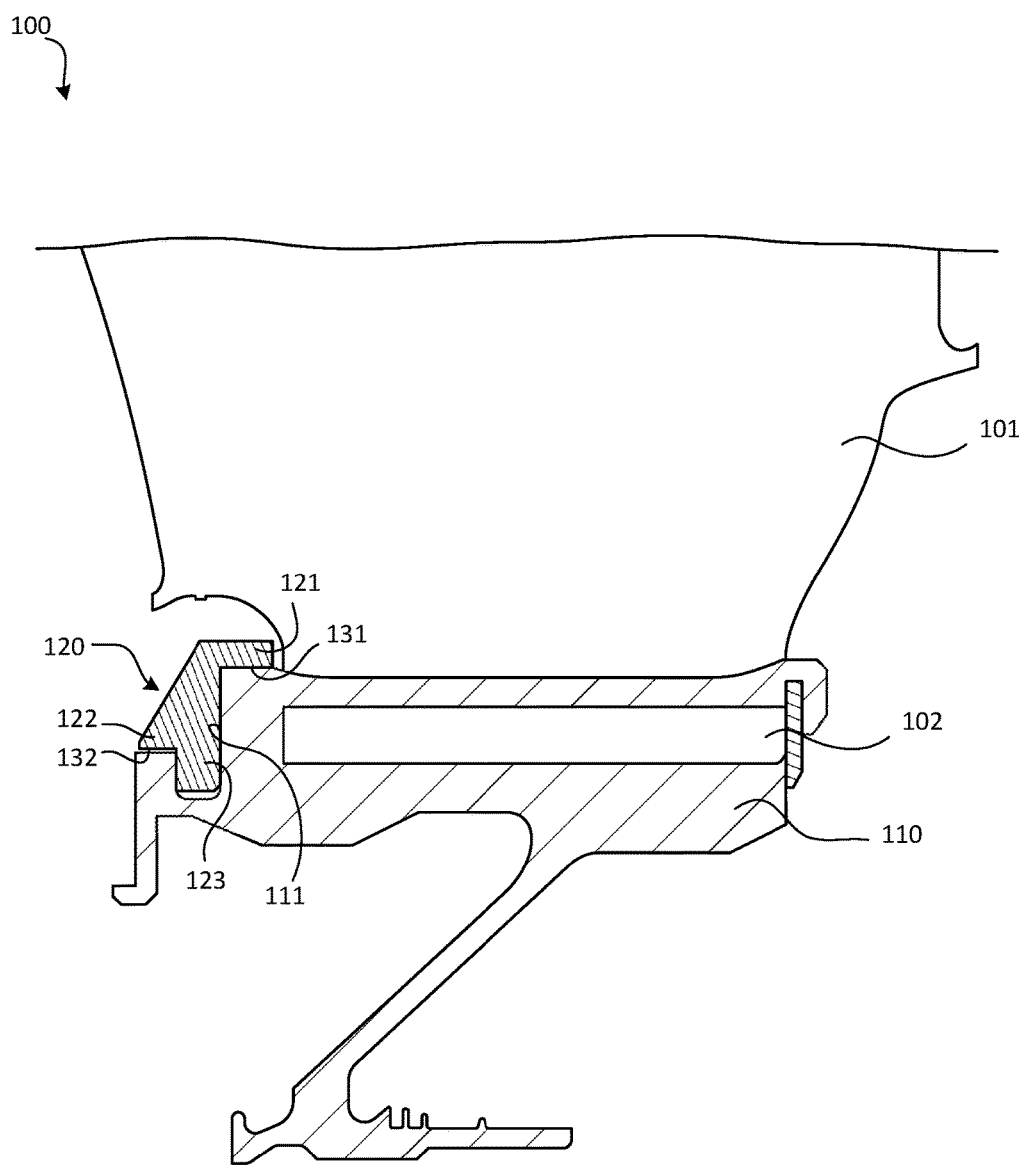
FIG. 3 is a cross-sectional view of a rotor disk assembly, in accordance with various embodiments.

In various embodiments, the dimensions of the retention ring 120 may be customized to vary circumferentially (e.g., the dimensions of the retention ring 120 may be non-uniform in the circumferential direction), thus improving the modal frequency response of the rotor disk assembly 100. For example, and with reference to FIG. 3, the retention ring 120 includes an axially extending flange 121 and a radially extending flange 123, and at least one of the axially extending flange 121 and the radially extending flange 123 may have a thickness that is tuned/customized in response to a predicted modal frequency response, according to various embodiments. In various embodiments, the radial thickness of the axially extending flange 121 varies circumferentially. In various embodiments, the axial thickness of the radially extending flange 123 varies circumferentially.

In various embodiments, in addition to contributing to the modal frequency response of the rotor disk assembly 100, the retention ring 120 also is configured to facilitate retention of the airfoils 101. For example, the radially extending flange 123 may be configured to provide axial retention of the airfoil 101 coupled to the slot 114 of the rotor disk 110. In various embodiments, the axially extending flange 121 is configured to provide radial retention of the airfoil 101. In various embodiments, the retention ring 120 includes a second axially extending flange 122 (i.e., radially extending flange 121 may be deemed a "first" radially extending flange), and corresponding axially extending surfaces 131, 132 of the axially extending flanges 121, 122 may engage the airfoil 101 to provide radial retention thereof. In various embodiments, the first axially extending flange 121 may extend axially aft of the radially extending flange 123 and the second axially extending flange 122 may extend axially forward of the radially extending flange 123.

In various embodiments, the retention ring 120 is an integral hoop. In various embodiments, the retention ring 120 may be constructed from multiple arcuate segments that jointly form the annular, circumferential retention ring 120. In various embodiments, the retention ring 120 is coupled to a forward side 111 (FIG. 3) of the rotor disk 110.

Figure 4:
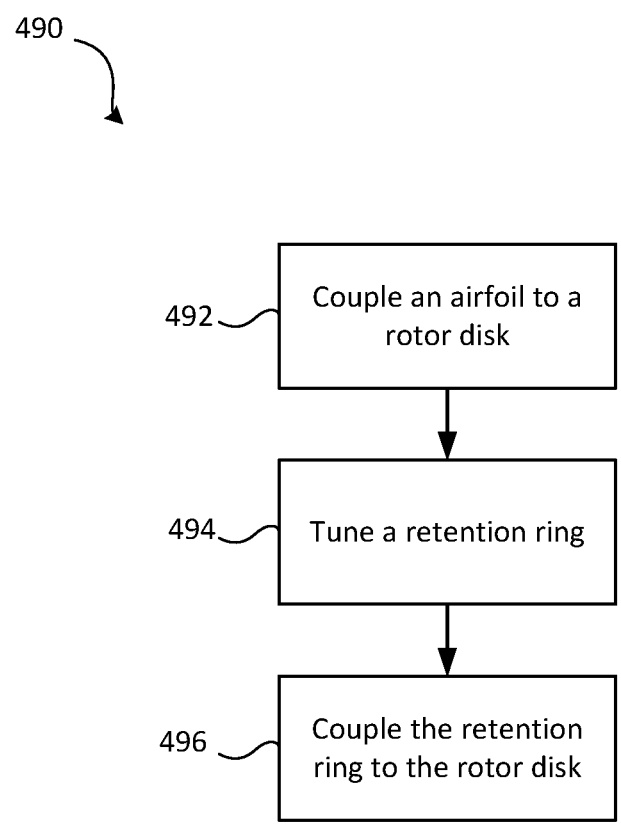
FIG. 4 is a schematic flow chart diagram of a method of manufacturing a gas turbine engine, in accordance with various embodiments.

In various embodiments, and with reference to FIG. 4, a method 490 of manufacturing a gas turbine engine is provided. The method 490 may include coupling an airfoil 101 to a rotor disk 110 at step 492, tuning a retention ring 120 at step 494, and coupling the retention ring 120 to the rotor disk 110 at step 496. In various embodiments, step 494 may occur before step 496. In various embodiments, step 494 includes varying dimensions of the retention ring 120 circumferentially in response to a predicted modal frequency response. In various embodiments, step 496 includes aligning the retention ring 120 with the rotor disk 110 in response to the predicted modal frequency response. That is, the orientation and alignment of the non-uniform retention ring 120 may be specific to the rotor disk 110 with the attached airfoils 101. In various embodiments, step 496 includes coupling the retention ring to a forward side 111 of the rotor disk 110.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotor disk assembly comprising:
   a rotor disk; and
   a retention ring coupled to the rotor disk, wherein dimensions of the retention ring vary circumferentially such that the retention ring is tuned to adjust a predicted modal frequency response of the rotor disk.

2. The rotor disk assembly of claim 1, wherein the retention ring comprises an axially extending flange and a radially extending flange.

3. The rotor disk assembly of claim 2, wherein a radial thickness of the axially extending flanges is non-uniform around the retention ring.

4. The rotor disk assembly of claim 2, wherein an axial thickness of the radially extending flange is non-uniform around the retention ring.

5. The rotor disk assembly of claim 1, wherein the retention ring is configured to provide axial retention of an airfoil coupled to the rotor disk.

6. The rotor disk assembly of claim 1, wherein the retention ring is configured to provide radial retention of an airfoil coupled to the rotor disk.

7. The rotor disk assembly of claim 6, wherein the axially extending flange, wherein the retention ring further comprises a second axially extending flange.

8. The rotor disk assembly of claim 1, wherein the retention ring is an integral hoop.

9. A gas turbine engine comprising:
   a rotor disk comprising an airfoil coupled to the rotor disk; and
   a retention ring coupled to the rotor disk, wherein dimensions of the retention ring vary circumferentially such that the retention ring is tuned to adjust a predicted modal frequency response of the rotor disk.

10. The gas turbine engine of claim 9, wherein the retention ring is coupled to a forward side of the rotor disk.

11. The gas turbine engine of claim 9, wherein the retention ring comprises an axially extending flange and a radially extending flange.

12. The gas turbine engine of claim 11, wherein a radial thickness of the axially extending flange is non-uniform in a circumferential direction.

13. The gas turbine engine of claim 11, wherein an axial thickness of the radially extending flange is non-uniform in a circumferential direction.

14. A method of manufacturing a gas turbine engine, the method comprising:
   coupling an airfoil to a rotor disk; and
   coupling a retention ring to the rotor disk, wherein at least one of radial dimension and an axial dimension of the retention ring is non-uniform around the retention ring such that the retention ring tuned to adjust a predicted modal frequency response of the rotor disk.

15. The method of claim 14, further comprising tuning the retention ring before coupling the retention ring to the rotor disk.

16. The method of claim 15, wherein tuning the retention ring comprises varying the at least one of the radial dimensions and the axial dimension of the of the retention ring circumferentially in response to a predicted modal frequency response.

17. The method of claim 16, wherein coupling the retention ring to the rotor disk comprises aligning the retention ring with the rotor disk in response to the predicted modal frequency response.

18. The method of claim 14, wherein coupling the retention ring to the rotor disk comprises coupling the retention ring to a forward side of the rotor disk.

* * * * *

UNITED STATES PATENT AND TRADEMARK OFFICE
CERTIFICATE OF CORRECTION

PATENT NO. : 10,458,244 B2
APPLICATION NO. : 15/787478
DATED : October 29, 2019
INVENTOR(S) : Peter V. Tomeo et al.

Page 1 of 1

It is certified that error appears in the above-identified patent and that said Letters Patent is hereby corrected as shown below:

In the Claims

In Column 8, Line number 27:
such that the retention ring tuned to adjust a predicted Should read:
such that the retention ring is tuned to adjust a predicted In Column 8, Line numbers 33-34:
ring comprises varying the at least one of the radial dimensions and the axial dimension of the retention ring Should read:
ring comprises varying the at least one of the radial dimension and the axial dimension of the retention ring Signed and Sealed this
Twenty-eighth Day of January, 2020

Andrei Iancu
*Director of the United States Patent and Trademark Office*